Dec. 12, 1950　　　F. W. ZINK　　　2,533,867
MIRROR SUPPORTING MEANS
Filed April 15, 1946
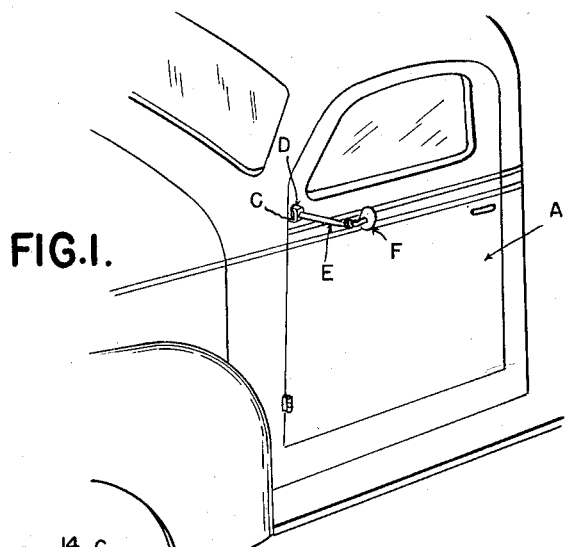
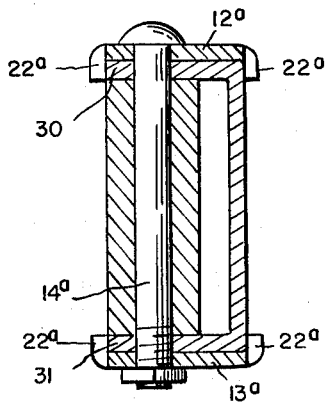
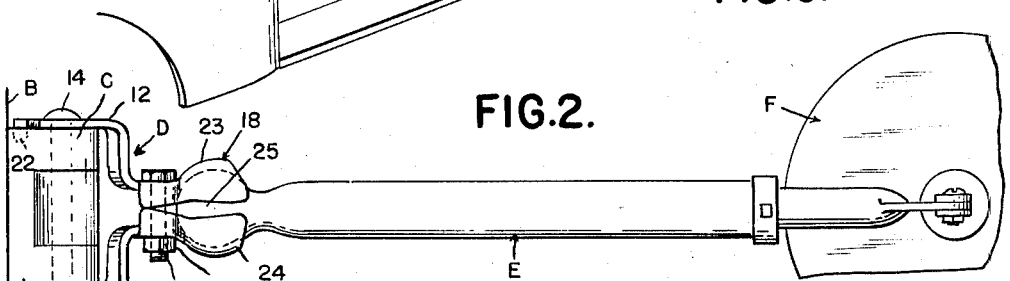
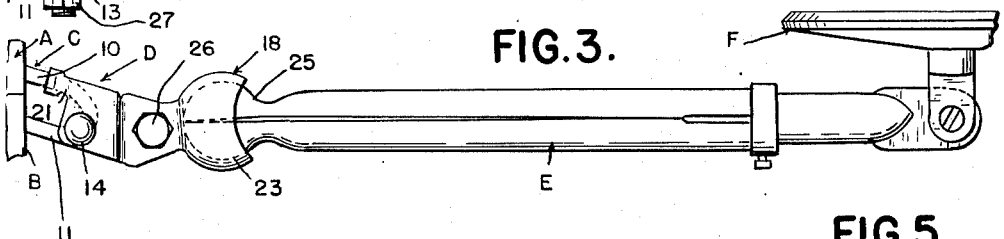
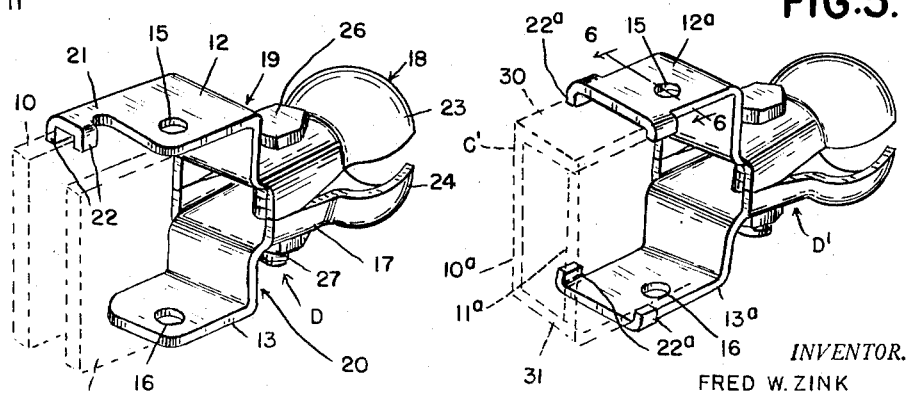
INVENTOR.
FRED W. ZINK
BY
Whittemore, Hulbert & Belknap
ATTORNEYS Patented Dec. 12, 1950

2,533,867

UNITED STATES PATENT OFFICE 2,533,867

MIRROR SUPPORTING MEANS

Fred W. Zink, Detroit, Mich., assignor to Whitehead Stamping Company, Detroit, Mich., a corporation of Michigan Application April 15, 1946, Serial No. 662,194

3 Claims. (Cl. 248—276)

This invention relates generally to supporting means for rear view mirrors and refers more particularly to an improved supporting means of the type adapted to be mounted upon or attached to the hinges of vehicle doors. The invention is especially useful for mounting a relatively long laterally extending mirror supporting arm upon a door hinge of a commercial vehicle such as a truck, tractor, and the like.

One of the essential objects of the invention is to provide a connection between the mirror supporting means and the hinge leaf or section that is rigid with the door so that the mirror supporting arm will be effectively held in proper laterally extending position relative to the door. Thus, the mirror supporting means and door are coupled through the door hinge so that relative movement between said mirror supporting means and door is prevented but both may swing in unison about the vertical axis of the hinge pivot pin or bolt, during opening and closing movements of the door.

Another object is to provide a supporting means that is simple in construction, economical to manufacture, easy to install, and efficient in operation.

Other objects, advantages and novel details of construction of this invention will be made more apparent as this description proceeds, especially when considered in connection with the accompanying drawing, wherein:

Fig. 1 is a perspective view of a portion of a motor vehicle body showing my improved mirror support attached thereto;

Fig. 2 is a fragmentary side elevation of the mirror support;

Fig. 3 is a plan view of the structure in Fig. 2;

Fig. 4 is a perspective view of the two-part bracket and showing by dotted lines a portion of the hinge to which said bracket is applied;

Fig. 5 is a view similar to Fig. 4 but showing a slightly modified construction; and Fig. 6 is a vertical sectional view taken on line 6—6 of Fig. 5 but showing by full lines portions of the hinge to which the bracket is applied.

Referring now to the drawing, A is a door, B is a supporting pillar therefor, and C are hinges pivotally connecting the door A to the pillar B. Such door A and pillar B may be portions of a cab or body of a truck and may be any suitable construction. As usual, each hinge C has two pivotally connected outwardly projecting leaves or sections 10 and 11 respectively secured to said door A and pillar B.

The mirror supporting means embodying my invention is preferably mounted upon the uppermost hinge C for the door A and comprises a two-part bracket D having substantially parallel ears 12 and 13 respectively embracing the top and bottom of the uppermost hinge C and secured thereto by the hinge pivot bolt 14. As shown, the ears 12 and 13 have aligned holes 15 and 16 respectively for receiving the pivot bolt 14 of said hinge. Such bracket D also has an arm portion 17 terminating in a spherical socket portion 18. Preferably the two parts 19 and 20 respectively of the bracket D are metal stampings and are similar in construction except for an edgewise extension 21 of the ear 12 that is utilized to connect the bracket D to the hinge leaf or section 10 for the door. As shown, this extension 21 is relatively narrow and is provided at opposite side edges thereof with laterally extending parallel projections 22 that straddle the adjacent edge of the hinge leaf 10. Thus, with this construction the bracket D and door A are coupled through the door hinge C so that relative movement between the bracket and door is prevented, but both may swing in unison about the vertical axis of the hinge pivot bolt 14 during opening and closing movements of the door.

In the present instance, the sections 23 and 24 respectively of the spherical socket portion 18 of the bracket form a socket for a ball or spherical end portion 25 of a mirror supporting arm E, and are held by a suitable bolt 26 and nut 27 in operative embracing engagement therewith. Preferably the bolt 26 extends through the arm portion 17 of the bracket and cooperates with the hinge pivot bolt 14 to maintain the bracket D in proper assembled relation with the hinge leaf 10. The mirror supporting arm E may be any suitable construction such, for example, as the construction illustrated in my pending application bearing Serial No. 645,556, and extends laterally outward form the bracket D so as to be disposed at the proper position relative to the door A. Any suitable mirror F may be carried by the arm E at its outer free end.

Thus, with the construction described the parallel projections 22 are in interlocking engagement with the hinge leaf 10 that is rigid with the door A, hence the bracket D and door A are effectively coupled together through the door hinge so that both the bracket and door will move in unison about the hinge pivot bolt 14. Inasmuch as the mirror supporting arm E is held by the bolt 26 and nut 27 in proper adjusted position relative to the bracket D and the latter is held by the parallel projections 22 against movement relative to the door A, it necessarily follows that the mirror supporting arm E will be held in proper laterally extending position relative to the door A.

In Figs. 5 and 6 I have illustrated a slight modification wherein the ears 12ª and 13ª respectively of the bracket D' are provided at opposite side edges thereof with laterally extending parallel projections 22ª that embrace or straddle the upper and lower horizontal flanges 30 and 31 respectively of the hinge leaf 10ª that is rigid with the door. 11ª is the other leaf of the hinge C'. Otherwise, the construction in Figs. 5 and 6 is the same as in Figs. 1 to 4 inclusive. Thus, the bracket D' and door are coupled through the door hinge so that relative movement between the bracket and door is prevented, but both may swing in unison about the vertical axis of the hinge pivot bolt 14ª during opening and closing movements of the door.

What I claim as my invention is:

1. A support for a rear view mirror adapted for use with a vehicle body door hinge having an upright pivot pin spaced outwardly from said vehicle body and two relatively movable hinge leaves mounted on said pivot pin and respectively attachable to a fixed pillar and to a swinging door of said vehicle body; comprising a substantially U-shaped bracket opening toward said vehicle body and provided outwardly of the base of the U with means for holding a supporting arm for a rear view mirror, the ears of said U being above and below and normally extending lengthwise of said hinge leaves, said ears terminating short of said vehicle body whereby said bracket is entirely free and out of contact with said vehicle body and is capable of movement relative thereto, said ears having vertically aligned holes receiving said pivot pin, and means fastening said bracket to the hinge leaf attachable to said door including a relatively narrow projection on one of said ears terminating in a U-shaped portion for embracing the door leaf whereby said bracket will move with said door relative to said vehicle body when said door is opened with respect thereto.

2. A support for a rear view mirror adapted for use with a vehicle body door hinge having an upright pivot pin spaced outwardly from said vehicle body and two relatively movable hinge leaves mounted on said pivot pin and respectively attachable to a fixed pillar and to a swinging door of said vehicle body; comprising a substantially U-shaped bracket opening toward said vehicle body and provided outwardly of the base of the U with means for holding a supporting arm for a rear view mirror, the ears of said U being above and below and normally extending lengthwise of said hinge leaves, said ears terminating short of said vehicle body whereby said bracket is entirely free and out of contact with said vehicle body and is capable of movement relative thereto, said ears having vertically aligned holes receiving said pivot pin, and means for connecting said bracket to said door to swing therewith relative to said vehicle body, including a projection on one of said ears fastened to the hinge leaf attachable to said door.

3. A support for a rear view mirror adapted for use with a vehicle body door hinge having an upright pivot pin spaced outwardly from said vehicle body and two relatively movable hinge leaves mounted on said pivot pin and respectively attachable to a fixed pillar and to a swinging door of said vehicle body; comprising a substantially U-shaped bracket opening toward said vehicle body and provided outwardly of the base of the U with means for holding a supporting arm for a rear view mirror, the ears of said U being above and below and normally extending lengthwise of said hinge leaves, said ears terminating short of said vehicle body whereby said bracket is entirely free and out of contact with said vehicle body and is capable of movement relative thereto, said ears having vertically aligned holes receiving said pivot pin, and means for connecting said bracket to said door to swing therewith relative to said vehicle body, including a substantially U-shaped projection on one of said ears embracing a portion of the hinge leaf attachable to said door.

FRED W. ZINK.

REFERENCES CITED

The following references are of record in the file of this patent:

UNITED STATES PATENTS

| Number | Name | Date |
|---|---|---|
| 2,134,016 | Zink | Oct. 25, 1938 |
| 2,156,849 | Gutierrez | May 2, 1939 |
| 2,237,282 | Reed | Apr. 1, 1941 |
| 2,419,923 | Tolbert | Apr. 19, 1947 |